UNITED STATES PATENT OFFICE.

WILLIAM J. COREY, OF GEORGETOWN, DELAWARE.

COUGH REMEDY.

SPECIFICATION forming part of Letters Patent No. 446,058, dated February 10, 1891.

Application filed August 8, 1890. Serial No. 361,446. (No specimens.)

*To all whom it may concern:*

Be it known that I, WILLIAM J. COREY, a citizen of the United States, residing at Georgetown, in the county of Sussex and State of Delaware, have invented a new and useful Medical Compound, of which the following is a specification.

The invention relates to a remedy for the treatment of coughs, colds, and pulmonary diseases.

The invention consists in the following ingredients, combined in the proportions stated, viz: hops, (*Humulus*,) two ounces; mullein, (*Verbascum*,) four ounces; hoarhound-tops, (*Marrubium*,) one ounce; wild-cherry-root bark, (*Prunus Virginiana*,) eight ounces; wild-poplar bark, (*Populus*,) four ounces; pipsissewa-tops, (*Chimaphila*,) one ounce; comfrey-root, (*Symphytum*,) one and one-half ounce; conquering tom (*Gentiana Andrewsii, Griseb*,) one and one-fourth ounce; granulated sugar, ten pounds; pure apple-vinegar, one and one-half pint; saltpeter, (nitrate of potash,) one and one-half ounce; pure pine-tar, (*Pix liquida*,) one pint.

The hops, mullein, hoarhound, wild-cherry-root bark, wild-poplar bark, pipsissewa, comfrey-root, and conquering tom are put in a sack to save straining, and four gallons of water are added, and the whole is boiled in a suitable vessel until the contents are reduced to two gallons. The contents of the sack are then squeezed, in order to give the liquid as much strength as possible, and two gallons of liquid will be left. The liquid is then boiled down to one and one-half gallon, and ten pounds of granulated sugar are added and the boiling continued until the entire contents of the vessel are reduced to one and a half gallon, and the mixture is then allowed to cool. Add a half-pint of pure apple-vinegar, with one-half ounce of saltpeter, and dissolve. When the mixture is at blood-heat, pour the same on pure pine-tar and let it stand forty-eight hours, and it is then ready for use.

In compounding the mixture both the tops and the roots of mullein are used.

The mixture is administered in doses of one table-spoonful four times a day for adults and one-half the quantity for children.

This medicine is a remedy for consumption in its second stage, for bronchitis, coughs, colds, la grippe, and also kidney diseases.

What I claim is—

A remedy for coughs and colds and pulmonary diseases and the like, consisting of hops, mullein, hoarhound, wild-cherry-root bark, wild-poplar bark, pipsissewa-tops, comfrey-root, conquering tom, (*Gentiana Andrewsii, Griseb*,) granulated sugar, pure apple-vinegar, saltpeter, and pure pine-tar, as set forth.

In testimony that I claim the foregoing as my own I have hereto affixed my signature in presence of two witnesses.

WILLIAM J. COREY.

Witnesses:
W. D. ADAMS,
JOS. P. MORRIS.